United States Patent [19]

Mashruwala et al.

[11] Patent Number: 5,295,242

[45] Date of Patent: Mar. 15, 1994

[54] APPARATUS AND METHOD FOR VIEWING RELATIONSHIPS IN A FACTORY MANAGEMENT SYSTEM

[75] Inventors: Rajesh U. Mashruwala; Richard L. Hess, both of Palo Alto; William L. Verplank, Menlo Park, all of Calif.

[73] Assignee: Consilium, Inc., Mountain View, Calif.

[21] Appl. No.: 608,310

[22] Filed: Nov. 2, 1990

[51] Int. Cl.$^5$ .............................................. G06F 15/62
[52] U.S. Cl. ...................................... 395/159; 395/161
[58] Field of Search ............... 395/133, 155, 156, 157, 395/159, 161

[56] References Cited

U.S. PATENT DOCUMENTS

| | | | |
|---|---|---|---|
| 4,613,946 | 9/1986 | Forman | 364/518 |
| 4,752,889 | 6/1988 | Rappaport et al. | 364/513 |
| 4,764,867 | 8/1988 | Hess | 364/200 |
| 4,772,882 | 9/1988 | Mical | 340/709 |
| 4,821,211 | 4/1989 | Torres | 364/521 |

Primary Examiner—Heather R. Herndon
Attorney, Agent, or Firm—Blakely, Sokoloff, Taylor and Zafman

[57] ABSTRACT

A method and apparatus for displaying the relationship of objects in a factory on a computer system display. A first icon is displayed, the first icon representing a first class of factory objects. A second icon is displayed, the second icon representing a second class of factory objects. A first connector connecting the first icons and second icons is displayed representing the relationship between the first and the second class of factory objects. The first icon is selected, thus displaying a first list of names of all objects comprising the first class of factory objects. Then, a first name from the first list of names is selected, and a second list of names is displayed. The second list of names comprises the names of all objects in the second class of factory objects associated with the object from the first class having the first name.

8 Claims, 15 Drawing Sheets

APPARATUS AND METHOD FOR VIEWING RELATIONSHIPS IN A FACTORY MANAGEMENT SYSTEM

BACKGROUND OF THE INVENTION

1. Field of the Invention

The present invention relates to a system for factory management. More particularly, this invention relates to an interface used for monitoring of factory objects in an object-oriented factory management system.

2. Background Information

Management of a factory which manufactures a product such as semiconductors or aircraft for example, requires monitoring the status of all aspects in the factory, including raw materials on hand, components, labor resources, and machinery at every step of the manufacturing process. Also, in order to maintain a full range of information regarding partially completed products, a scheme for monitoring manufacturing will also maintain a list of current works in progress. The maintaining of such information allows a manager to determine whether his resources are being used at their full potential, and whether stores of raw materials should be replenished. It also allows a factory supervisor to determine the status of a customer's order and allow for scheduling of critical resources such as labor and machinery.

One prior approach to managing a factory was the WORKSTREAM factory management system manufactured by Consilium, Inc. of Mountain View, Calif. In the WORKSTREAM system, raw materials, machines, labor units, and finished products may be viewed or manipulated. An approach taken by the WORKSTREAM system and other factory management systems is to prompt users for input from a keyboard to determine the status of labor, machines and other things in the factory environment. In addition, this product allowed the tracking of products as they were manufactured to allow scheduling and efficient resource management for running the factory at its fullest potential. This system would query the user during certain operations for information and the user would input that information after being prompted by the system.

One problem with previous systems was that the relationships between factory objects such as components, raw materials, labor, machinery, among others, was not clearly presented to the user of the system. In addition, the factory structure was not clearly defined in the system and thus was not clearly represented to the user. This prior art system also did not present a way in which various information could be linked to manufactured products in the system, such as bills of materials, bills of resources, etc. Lastly, the system did not provide a way of viewing manufacturing steps for a given product in the system, or for testing to assure the quality of a manufactured product.

SUMMARY AND OBJECTS OF THE INVENTION

One of the objects of the present invention is to provide a clear representation of the organization of objects in a factory for access and manipulation by a user.

Another object of the present invention is to provide a system which clearly illustrates to a user the organization of the factory.

Another object of the present invention is to provide a system which displays a factory in such a way that a user of the system can easily monitor resources, raw materials and components in the manufacturing process.

These and other objects of the present invention are provided for by a method and apparatus for displaying the relationship of objects in a factory on a computer system display, by displaying a first icon, the first icon representing a first class of factory objects. In a particular embodiment, the first class may be a factory, for example. A second icon is displayed, the second icon representing a second class of factory objects. In a particular embodiment, the second class may be work areas in a factory. A first connector connecting the first icon and second icon is displayed representing the relationship between the first and the second class of factory objects. Then, the first icon is selected, thus displaying a first list of names of all objects comprising the first class of factory objects, such as factory names in a particular embodiment. Then, a first name from the first list of names is selected, and a second list of names is displayed. The second list of names comprises the names of all objects in the second class of factory objects associated with the object from the first class having the first name. In a particular embodiment, the second list of names comprises all work areas in the particular factory selected. In alternative embodiments, other factory objects may be displayed such as items, work orders, components, scripts, test plans, work cells, work stations, storage areas, machines, and labor, among others.

BRIEF DESCRIPTION OF DRAWINGS

The present invention is illustrated by way of example and not limitation in the figures of the accompanying in which like references indicate similar elements and in which:

FIG. 11b shows a selected icon of a second object class with the second column heading filled in.

DETAILED DESCRIPTION

An apparatus and method for displaying objects in a factory management system is described. In the following description, for the purposes of explanation, specific configurations, fields, and objects are described in order to provide a thorough understanding of the present invention. However, it will be apparent to one skilled in the art that the present invention may be practiced without these specific details. In other instances, well known hardware devices are shown in block diagram form in order to avoid unnecessarily obscuring the present invention.

Figure 1:
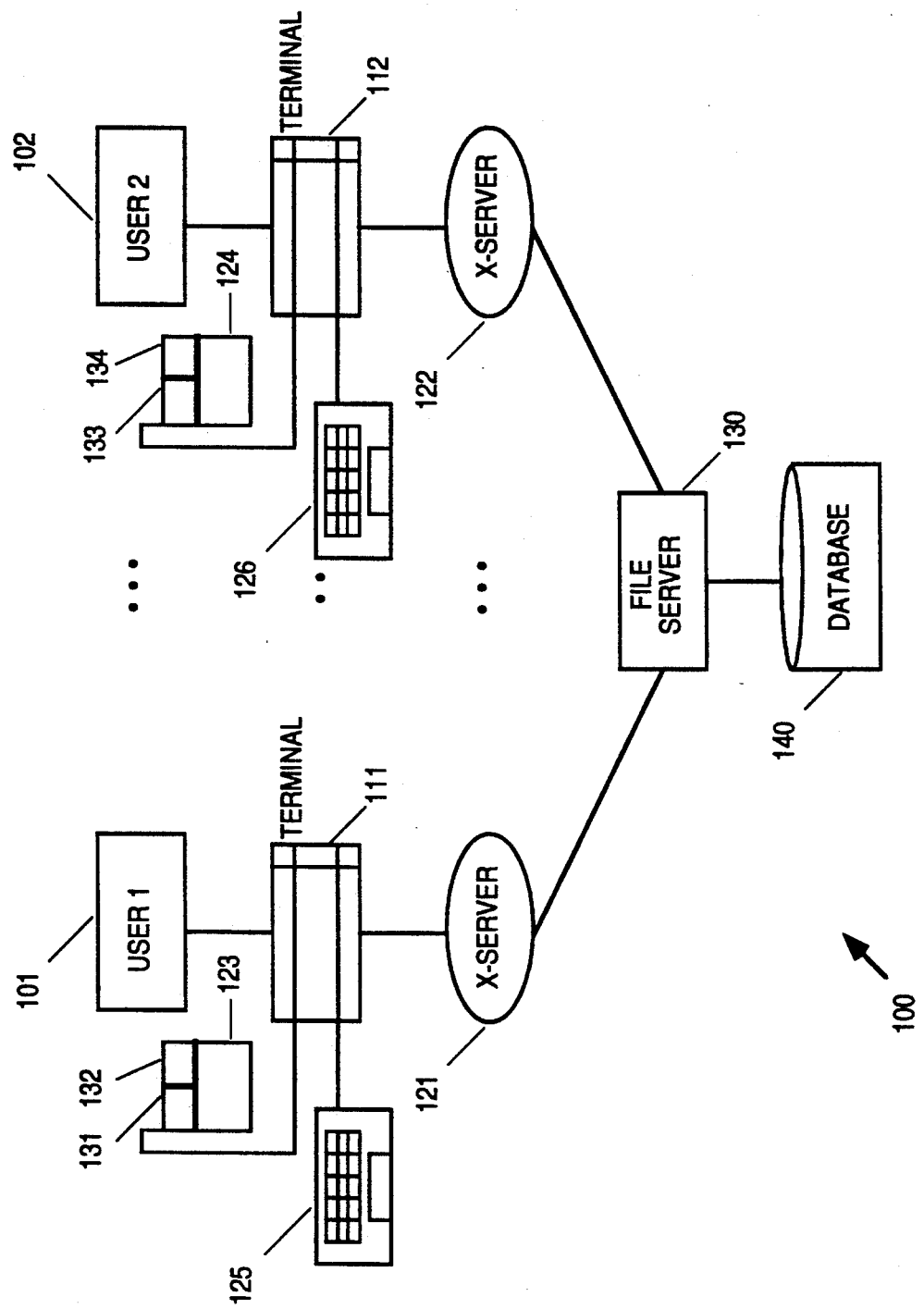
FIG. 1 shows a block diagram of the structure of the factory management system of the preferred embodiment.

Referring to FIG. 1, a factory floor management system 100 is shown. Two users 101 and 102 may be active upon system 100 and communicate on system 100 through terminals 111 and 112. User 101 may be communicating on system 100 via terminal 111 and user 102 may be communicating information on system 100 via terminal 112. On terminals 111 and 112 various commands may be entered by users 101 and 102, or, alternatively, information may be monitored. Each terminal 111 and 112 comprise a keyboard, 125 and 126 respectively, and cursor controls 123 and 124 respectively for inputting information into terminals 111 and 112. Cursor controls 123 and 124 are used for moving and selecting information on terminal screens 111 and 122. Cursor controls 123 and 124 are mouse input devices in the preferred embodiment, but in an alternative embodiment may be some other type of cursor control, such as a trackball or joystick, for example. In the preferred embodiment, each mouse 123 and 124 comprises two selection buttons (131 and 132 for device 123, 133 and 134 for device 124) for "selecting" regions on screens 111 and 112. Selection is done by depressing one of the buttons on the corresponding input device. One of the buttons, for the purposes of the remainder of this application, is known as "MB1" (mouse button 1) and the other is known as "MB2" (mouse button 2). Either the right or left button on the input device may be configured, in the preferred embodiment, as the primary selection button "MB1." For instance, on input device 123, for a right-handed user, button 131 may be set up as "MB1" and 132 may be "MB2." For a left-handed user, the selection button assignment may be reversed.

Each of the input devices 111 and 112 are coupled to their corresponding server devices 121 and 122. These provide an interface to the remainder of system 100 from each respective input device. Terminal servers 121 and 122 are coupled to a file server 130 which provides access to a database 140 containing the information regarding factory objects in the factory configured in the preferred embodiment.

Each node on system 100 such as terminals 111 and 112 may be an X-terminal and each of their corresponding servers shown as 121 and 122, may be one of the VAX family of computers manufactured by Digital Equipment Corporation (DEC) of Waltham, Mass. In the preferred embodiment, servers 121 and 122 are one of the VAX 4000 or 3100 series of work stations. In the preferred embodiment, servers 121 and 122 are running the VMS operating system also manufactured by DEC Computers of Waltham, Mass. Each server runs the "DEC-Windows" user interface environment as a shell which allows relatively easy user interaction on system 100. The preferred embodiment is implemented using this the "DEC-Windows" user interface shell.

ORGANIZATION OF THE FACTORY

Figure 2:
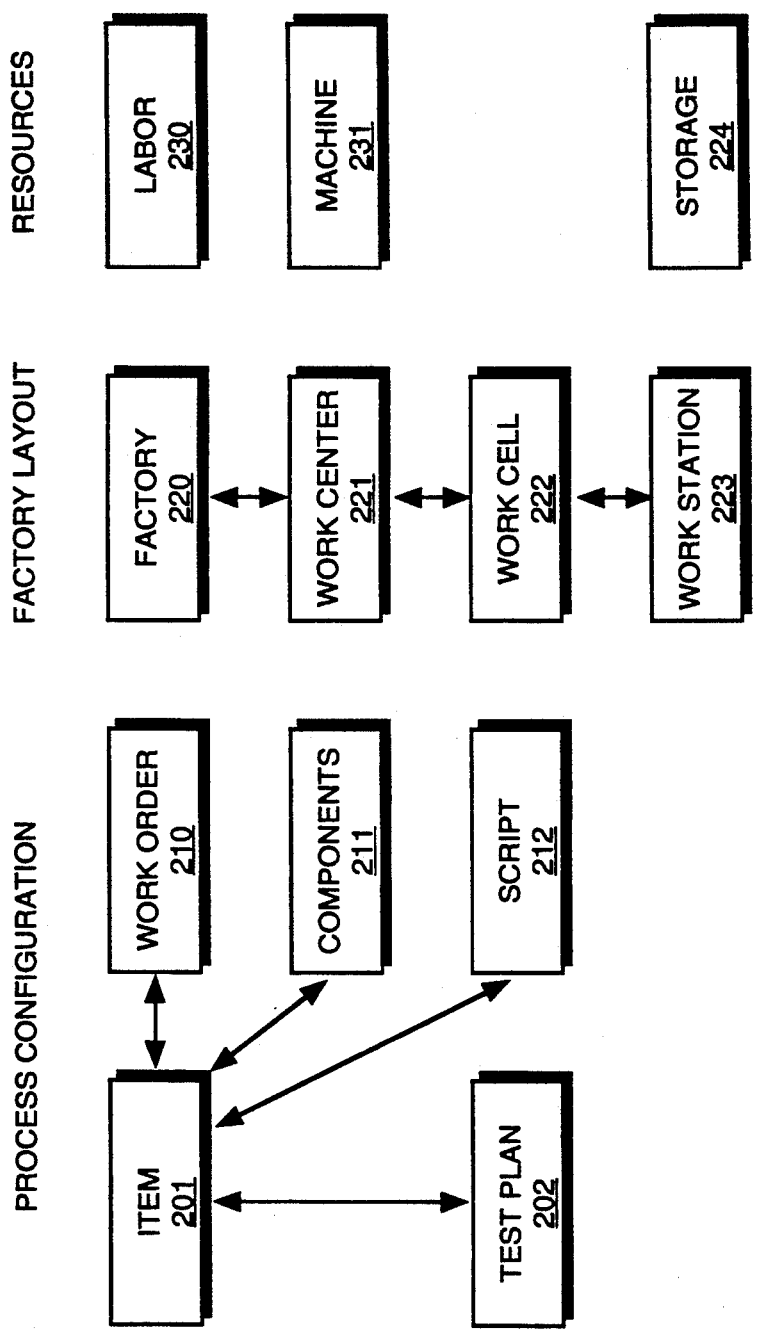
FIG. 2 shows the organization of factory object classes in the preferred embodiment.

System 100 of the preferred embodiment utilizes a "object-oriented" approach to structuring the factory environment. Each of the resources in the system is considered an object which may be viewed, manipulated or linked with other objects in the system. Attributes may be changed for each object, and objects may be associated with other objects. A general layout of the objects used in the preferred embodiment is shown in FIG. 2. Also shown in FIG. 2 is each of the objects' relationships with respect to one another. For simplicity, however, certain relationships have not been shown. For instance, an item 201 (a product which is produced by the factory) is linked with a work order 210, components 211, script 212, and test plan 202. An item may be a component of a larger item to be manufactured, or it may be a finished product produced from raw materials. An item 201, in order to be manufactured, must have a work order 210 associated with it. Work order 210 will contain such information as when manufacturing is or will be started on the item, and/or when the item was completed. Work order 210 might also contain such information as the number of items which were or are required to be manufactured. An item may also be linked with such information as resources required, such as labor or machinery (see objects 230 and 231) or other information which is required to manufacture item 201.

In addition, an item may have a components object 211 associated with it. A components object may include a list of other items which comprise an item 201. Alternatively, it may have a list of raw materials (which are also set up as items) which comprise 201. In addition, item 201 may have a script 212 associated with it. Script 212 is basically a series of commands and/or instructions which are associated with the production of the item. This information includes directions to an operator of a particular machine manufacturing the item, and/or specific operations which must be performed at each step of the manufacturing process to produce the item. Finally, item 201 is linked with a test plan 202, which is a series of instructions and/or operations within system 100 which must be performed to indicate whether item 201 meets certain minimum standards to operate within tolerances. For instance, a quality assurance program may be utilized in system 100. One such system is known as the RS/1 quality management system manufactured by BBN Software Products Corporation of Cambridge, Mass., and may operate on servers 121 or 122.

In addition to defining the relationship in the process for the production of an item, as discussed above, the preferred embodiment also allows the structure of the factory to be defined. The layout of the factory is done in a hierarchical fashion (as opposed to the relationships in the Process Configuration section). That is, parent units represent larger portions of the factory and child objects represent smaller areas in the factory. This is also graphically represented in FIG. 2. As shown in FIG. 2, factory 220 resides at the highest level in the Factory Layout hierarchy. The child of factory 220 is work center 221. Work center 221 may be thought of a subset of a factory in which a certain set of functions are performed. As a subset of work center 221, work cell 222 is an area of work center 221 in which specific functions are performed. Lastly, the smallest unit of work areas in the factory, is work station 223. Work station 223 is a particular machine or place in which either an individual or a limited number of individuals perform one given task. Coupled to work station 223, is storage area 224. When items are completed at a work station 223 they are typically put into a storage area.

Storage areas may feed into work stations, work stations may feed into storage areas or each of these may feed into another object having the same class (e.g. work station to work station or storage area to storage area).

In addition to the Process Configuration and Factory Layout structure provided in the preferred embodiment, the preferred embodiment also provides a list of objects known as "Resources." Resources in this model of the preferred embodiment include labor 230, machine 231 and 224. Labor 230 is an object which indicates the type of labor resources available in the factory. Labor 230 includes each employee and the number of hours (man hours) available for that employee to work and whether the employee is available to work (e.g. is at the factory). Labor may also indicate the skills of each employee, since certain employees may not be qualified to work with certain equipment or at certain work stations. Therefore, types of labor may be delineated within the factory environment.

Machine 231 is another resource and functions similarly to labor 230. Machines are used for manufacturing items in the factory. Each machine may be categorized by qualification (such as whether the machine may manufacture a particular type of item and its capacity). Each machine object may also have status indicators such as whether the machine is currently operating or is in a maintenance mode and therefore unavailable. Such a status indicator may also indicate that a particular machine is idle and thus available for use. The various objects discussed above and shown in FIG. 2 will now be discussed with reference to specific examples in order to provide a clear understanding of the preferred embodiment.

USER INTERFACE

Figure 3:
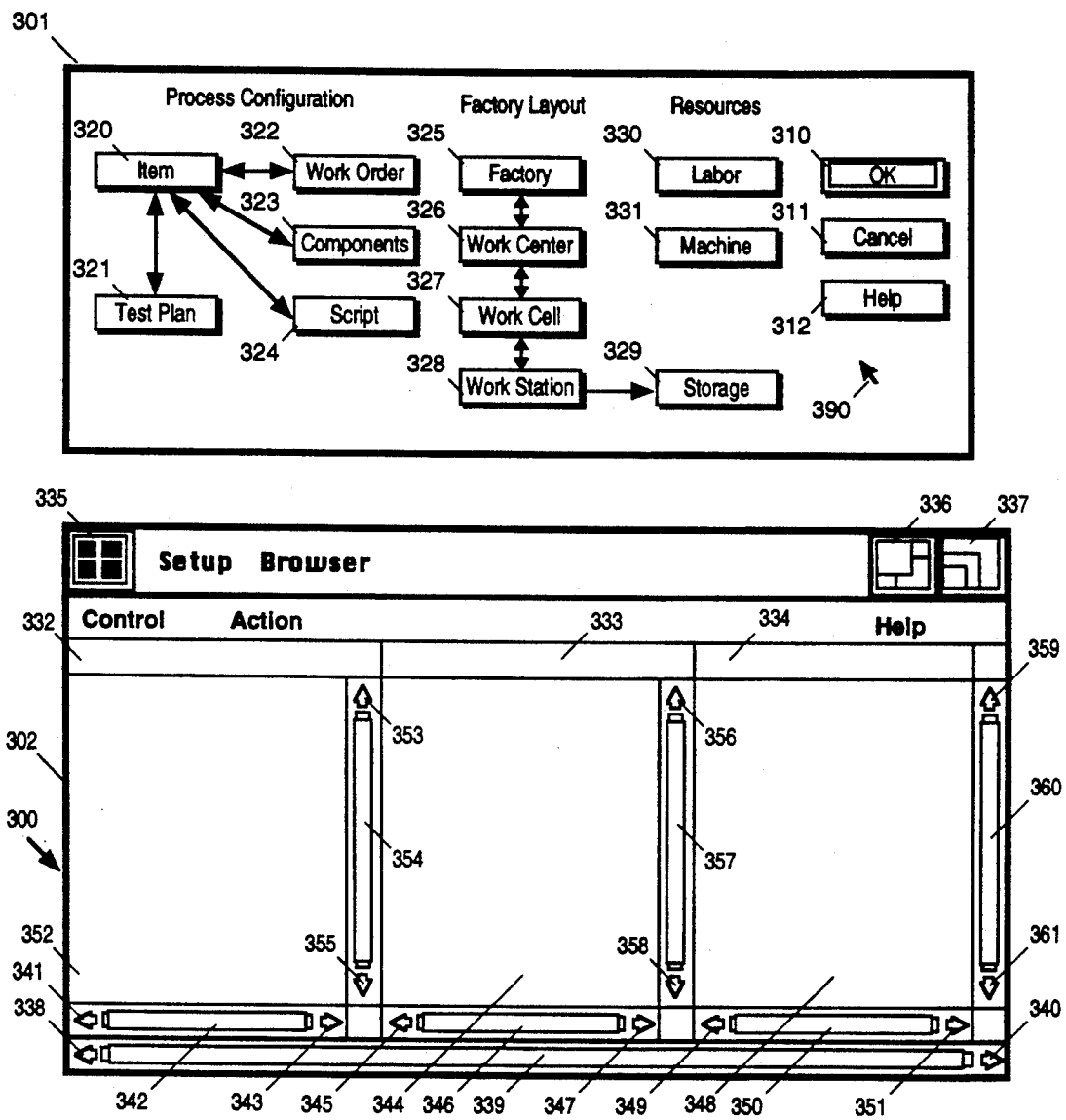
FIG. 3 shows the browser interface of the preferred embodiment.

FIG. 3 shows the "Browser" display screen 300 which allows various objects in the system of the preferred embodiment to be viewed on a user terminal such as 111 or 112. The window shown as 302 in FIG. 3 is the "Setup Browser" interface used for defining objects in the system. As can be seen from viewing FIG. 3, window 301 is a graphical representation on a computer screen of the structure and relationship of the objects which were discussed with reference to FIG. 2. The graphical representation of the objects on window 301 is useful for viewing and defining relationships between objects using interface 302 on screen 300. Window 301 also contains the "buttons" "OK" 310, "Cancel" 311 and "Help" 312. "Buttons" are areas in a user interface screen which, when "selected," cause a specific function to occur. Selection is done by moving a cursor such as 390 using an input device such as 122 or 124 on FIG. 1 to that area of the screen and depressing a button, such as MB1. "OK" 310 is selected using cursor 390 shown in FIG. 3 when an operation has been indicated on the display that the user wishes to perform. "Cancel" 311 is selected using cursor 390 when an operation has been initiated that the user now wishes to abort. Finally, window 301 comprises a "Help" button 312 which is selected using cursor 390 if a user desires additional information on a function provided by screen 301.

As is shown in FIG. 3, window 302 comprises three currently displayed columns 352, 344, and 348. Each of the columns will contain named objects within an object class once an icon for the class has been selected in a certain manner on window 301. Each of the displayed columns has a header field 332, 333 or 334 associated with it which displays the name of the class of the objects which are shown in the corresponding column. If there are more objects than is possible to show on the column of browser window 302, then the remainder of the objects are not displayed and may be viewed by selecting down arrows 355, 358 or 361 causing the corresponding column to "scroll" downward. In addition, if the user has already scrolled past information which he now desires to view, he may "scroll" up on the list of items shown each of the columns 352, 344 and 349 by selecting the corresponding up arrows 353, 356 or 359 using cursor 390. This causes objects in the class to come into view from the top of each column. Lastly, for scrolling information manually in each column, the user may select and move one of the sliders 354, 357 or 360. While selected by holding MB1, the user may slide up or down in each of the lists shown in the corresponding columns until an object which the user wishes to view is displayed in the column. Arrows 341, 345 and 349 work similarly for object names that extend to the left of the currently displayed information in each the column. Right arrows 343, 347 and 351 work in a similar manner for object names that extend to the right of the currently displayed information in each column. Sliders 342, 346 and 350 work in a similar manner to sliders 354, 357 or 360 but in the horizontal directions shown in FIG. 3. Lastly, window slider 339 and arrows 338 and 340 work in a similar manner to the other sliders but are used for displaying additional columns not currently displayed on window 302. In other words, if there is a column to the left of the column currently displayed in window 302, then left arrow 338 may be selected and the next left column will be displayed. Right arrow 340 works in the right direction in FIG. 3 for columns that a user wishes to display. Slider 339 will work in either direction when the user selects it and moves the input device (and thus the slider) in the desired direction. The user does this while MB1 is depressed and slider 339 is moved so that the column he wishes to view is displayed. Also, clicking on slider 339 will "scroll" the column display one column in either direction depending on what area of the slider is selected.

Also included on browser window 302 in FIG. 3 is the front/back box 336 and the size box 337. 336 is used when multiple windows reside on a terminal screen such as 111 or 112 shown in FIG. 1 and a user wishes to bring the current browser window 302 to the front of all the displayed screens for easy access. Since servers 121 and 122 may display multiple windows on screens 111 and 112, this is a convenient feature of the interface. Further, size box 337 is used for shrinking the browser window 302 to a reduced size so that the user may operate on another displayed window of terminal screen 111 or 112. Lastly, window 302 comprises a close box 335 which, when selected by a user "closes" the browser window 302 display (i.e. makes it disappear from the screen and exits those functions). The foregoing features such as the up/down, left/right arrows, sliders, close, size and front/back boxes are all standard features provided by the DEC's DEC-Windows interface. The nature of the information displayed and the format in which they are displayed are unique, however.

VIEWING OBJECTS

Figure 4:
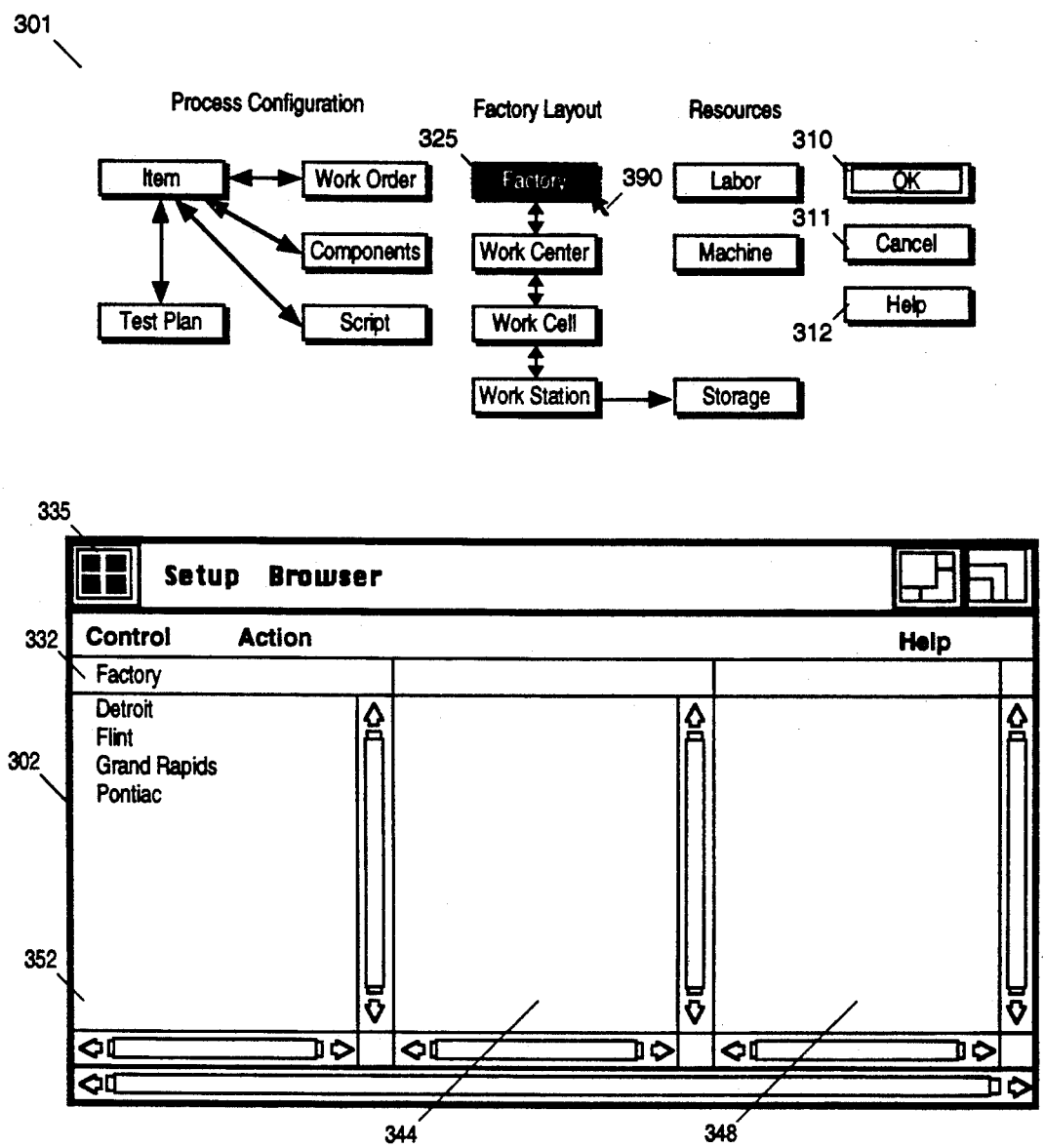
FIG. 4 shows selecting an object icon and populating a column of the browser window.

One example of using the user interface of the preferred embodiment is shown in FIG. 4. For instance, in a particularly configured system 100, a user may decide to view all the current factories in the system residing on database 140. To perform this function, the user will first select a column for the factories to be listed in by selecting a column heading, such as 332, with the cursor 390 using the input device. Then, the user will move cursor 390 and select the factory icon 325 on window 301. As can be seen on window 301 of FIG. 4, factory icon 325 has now been "highlighted" (by being displayed in reverse video—white letters on a black background) to indicate that it has been selected. Once an icon such as factory object icon 325 has been selected on window 301, the user must select the OK button 310 in order to populate the selected column of window 302 with the factory names residing on system 100. Alternatively, an icon such as 325 of window 301 may be double-clicked (two rapid clicks of MB1 in immediate succession) in order to populate the column. Then, the selected column 352 is populated with object names from database 140 of selected object class represented by the highlighted icon 325 of window 301. For instance, if icon 325 was double-clicked, and column 352 had been selected as the destination column, then column 352 would be filled with the factory names from the working database residing on database 140. Also, the heading field 332 of column 352 will display the class name ("Factory") of the objects populating column 352. When a column is filled, the browser map 301 disappears from the display screen 300, and only window 302 remains. Browser map 301 will be redisplayed when an additional column has been selected. Once a column has been filled in this manner, the next right column 344 may be filled by selecting a name listed in column 352.

VIEWING THE RELATIONSHIPS BETWEEN OBJECTS

Figure 5:
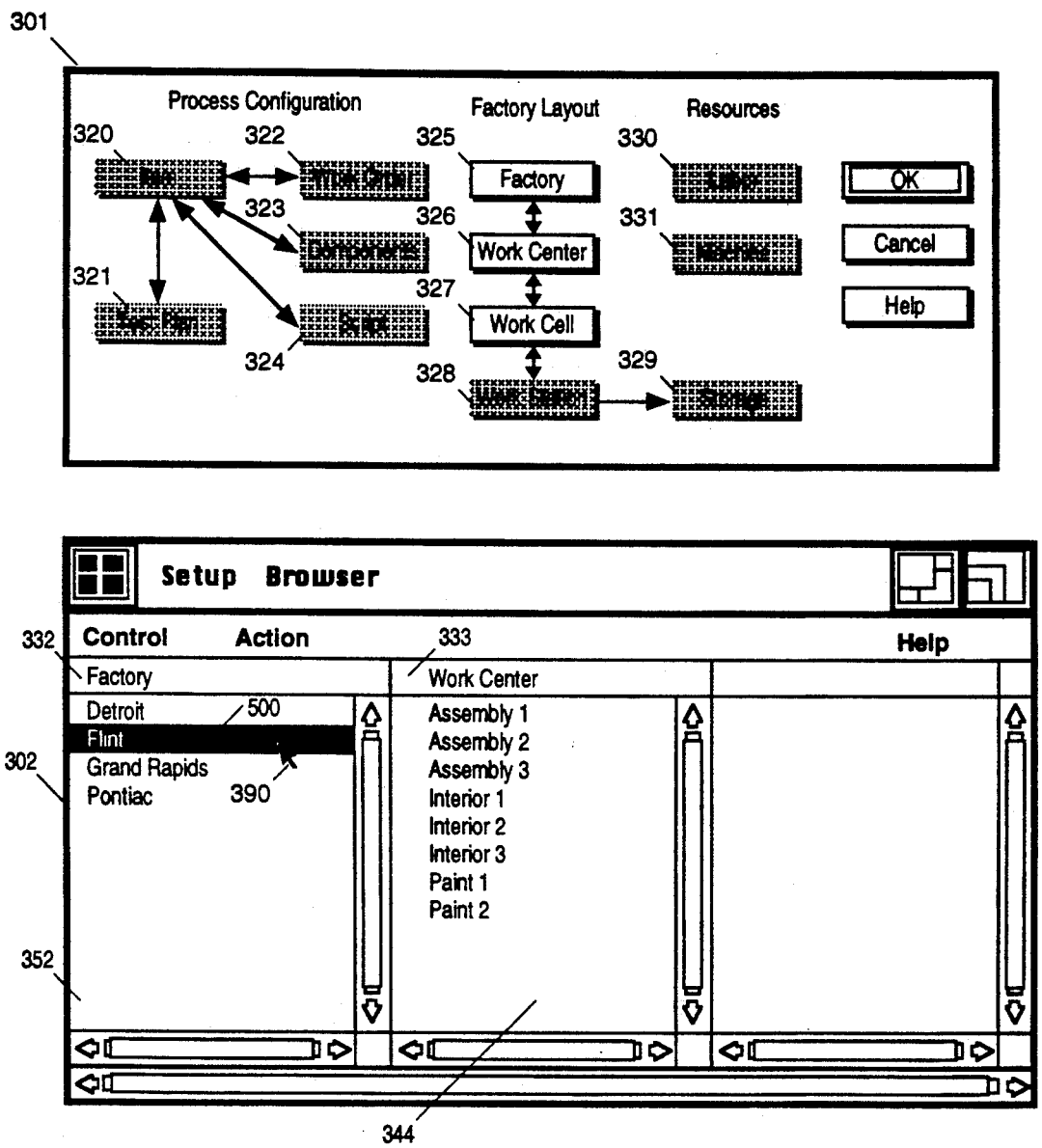
FIG. 5 shows populating a second column by selecting an item name in the first column.

As shown in FIG. 5, one of the factory names 500 contained in column 352 of window 302 may be selected using cursor 390 thus causing the next right column 344 (which had been selected as discussed before) to display information. In the example shown in FIG. 5, the heading for the next column 333 is first selected using cursor 390 and the browser map 301 is re-displayed on screen 300. As is shown in FIG. 5, the Factory Layout portion of the window looks the same, however, the Process Configuration icons, Resources icons and the factory 325, work cell 327, work station 328, and storage 329 icons of window 301 are now "greyed out." Greying-out is the process of dimming an icon so that it is not represented in its full intensity. Alternatively, every other pixel on each greyed-out icon of the display is cleared to the background color, to make the icon appear lighter in color. Greying-out indicates that the option exists, but are not available for selection at this time by the user. When a column is selected, the browser map will indicate which object relationship(s) can be displayed by "greying" out non-selectable icons. So, at this time as shown in window 301, only the factory 325, work center 326 and work cell 327 icons are selectable, indicating objects of these classes only may be viewed in the right next column. So, as shown in window 302, a particular factory name 500 in the factory name list in column 352 may be selected, and column 344 will be filled with the names of work centers associated with that named object. As shown in FIG. 5, 344 now contains the names of the work centers for the selected "Flint" factory object 500. In addition, the heading field 333 contains the class name of the object names ("Work Center") listed in column 344. The browser window map 301 then disappears until the next column is selected for an operation. This process may be repeated in this fashion until the names residing at the lowest levels in the hierarchy shown in the Factory Layout section of browser map 301 are displayed.

Figure 6:
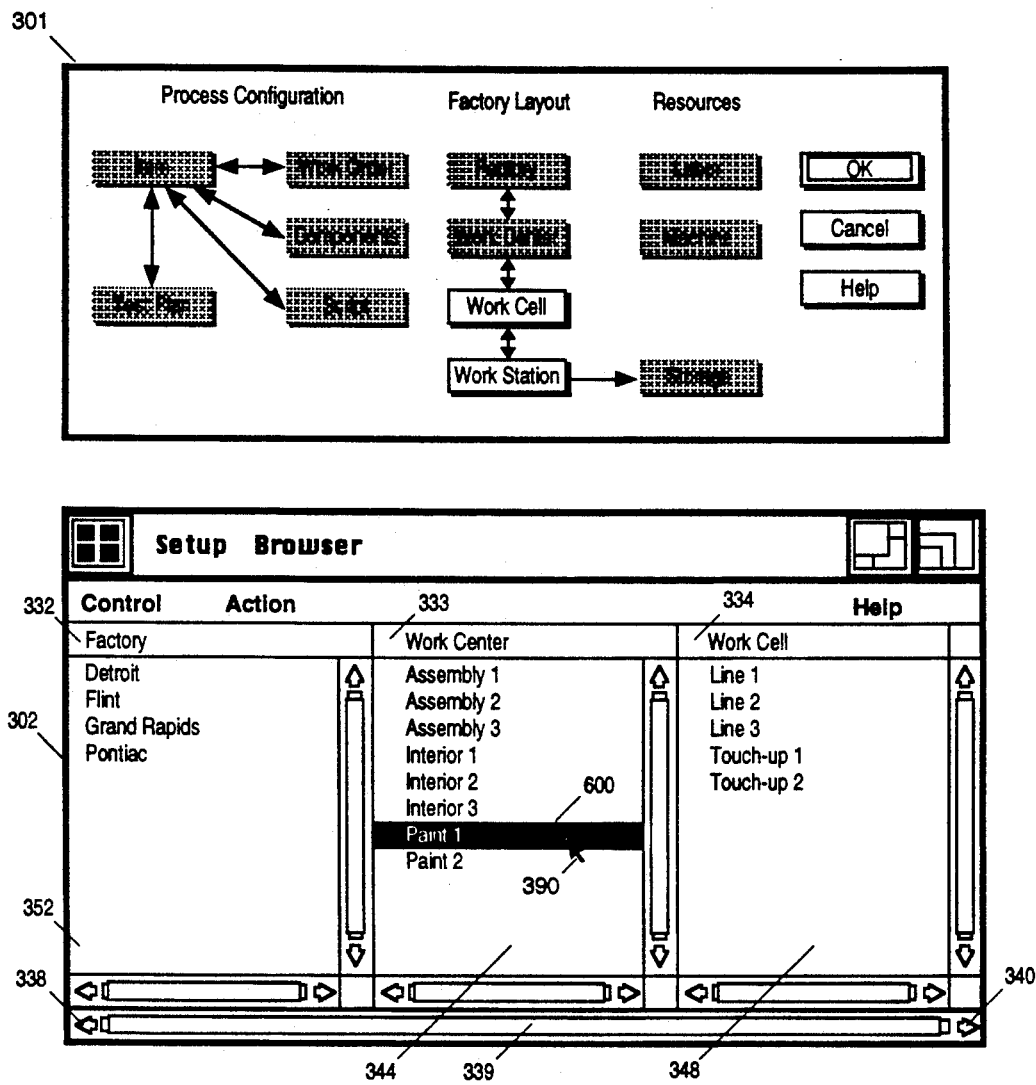
FIGS. 6 and 7 show populating additional columns by selecting object names and columns in the browser window.

As shown in FIG. 6, item 600 of column 344 has been selected the user, and thus the system has populated column 348 with the work cell names corresponding with the selected work center name 600 in column 344. In addition, the system has displayed the class name of the object ("Work Cell") in the heading field 334 of column 348 of the objects which are listed in column 348. Then, if the user wishes to view additional named objects associated with one of the listed objects in column 348, more columns must be displayed to the right by either using right arrow 340 or slider 339. Additional columns are accessed, as mentioned above, when the user selects right arrow 340 or slider 339 until additional columns are displayed on browser window 302.

Figure 7:
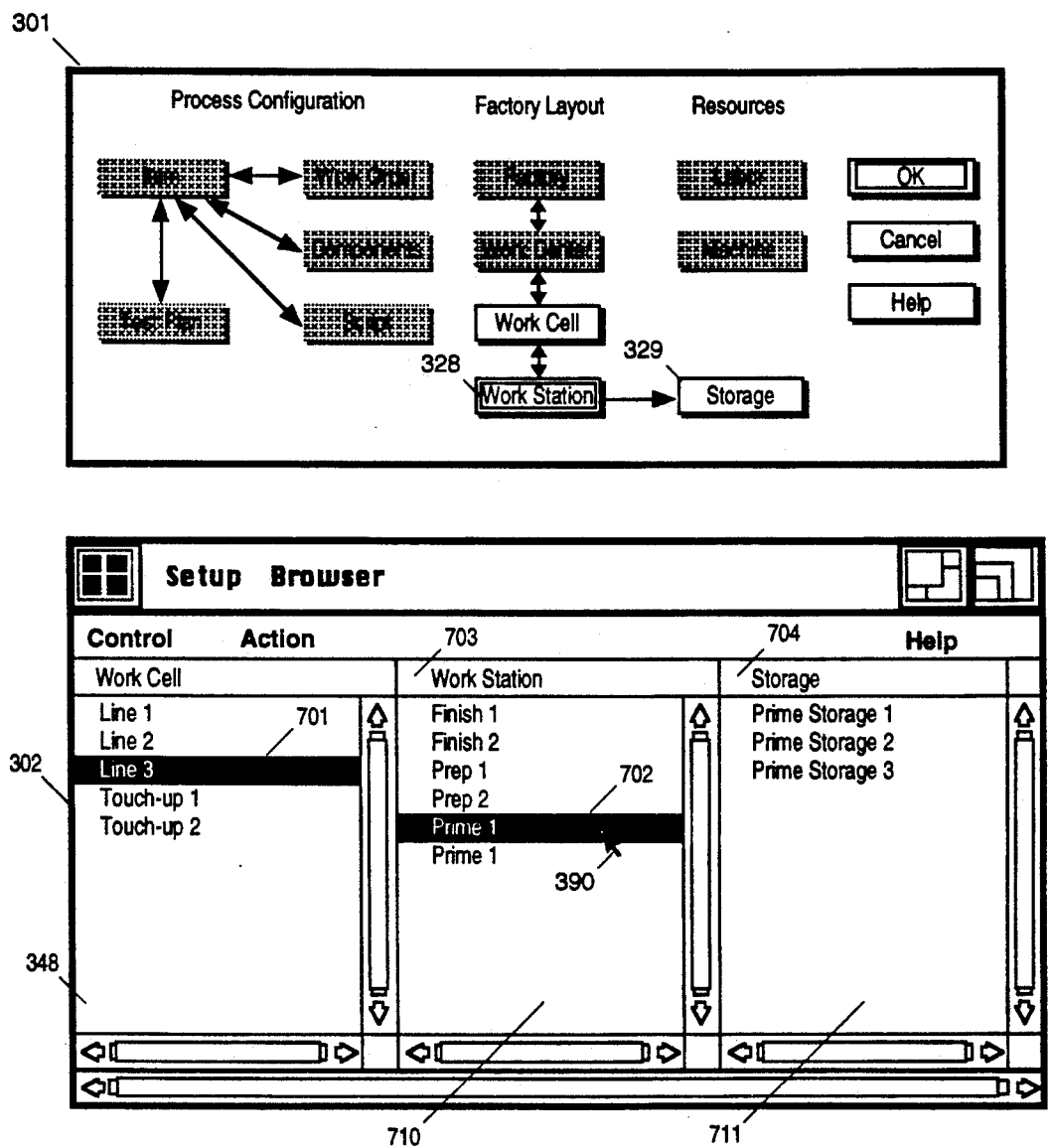
Figure 8:
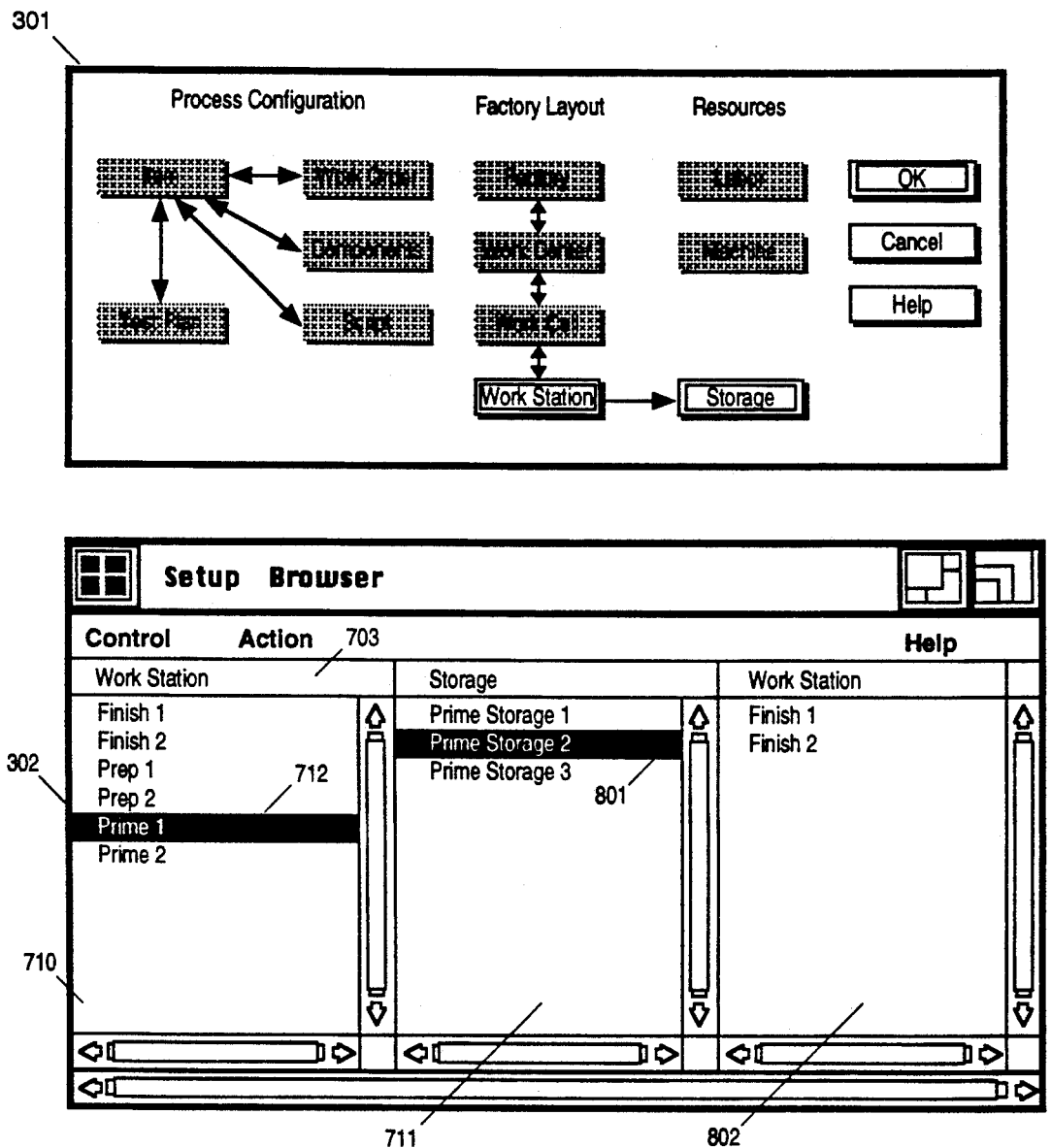
FIG. 8 shows how work stations may feed storage areas and vice-versa.

As shown in FIG. 7, window 302 now has two additional columns 710 and 711 displayed which contain the names of work station objects and storage objects, respectively. This was done in the manner mentioned above, by selecting columns selecting icons, and then selecting named objects in each list for which additional information was required. As shown in FIG. 7, "Line 3" work cell 701 in column 348 has been selected, and "Prime 1" work station 702 has been selected in column 710. Notice also, as discussed above, that the header fields 703 and 704 now contain the object class names "Work Station" and "Storage", respectively. Note that the storage object icon 329 on the browser map 301 is not in a pure hierarchical relationship with the work station object icon 328. This is represented by being to the right of work station object icon 328 on browser window map 301. In the factory layout structure, all of the objects are in a one-to-many relationship except for work stations and storage. That is, "Line 3" work cell 701 shown in FIG. 6 will only map to one work center "Paint 1" shown in FIG. 6 and the "Paint 1" work center 602 will only map to one factory "Flint" 501 shown in FIG. 5. However, storage areas and work stations are in a "many-to-many" relationship. That is, many storage areas may be both input and output areas from several work stations. For instance, as shown in FIG. 8, "Prime 1" work station 702 may have as outputs shown in column 711 "Prime Storage 1", "Prime Storage 2" and "Prime storage 3." As shown in FIG. 8, "Prime Storage 2" 801 shown in column 711 may be selected. This storage area may then be an input (a "feeder") to additional work stations "Finish 1" and "Finish 2" as shown in column 802 in FIG. 8. Therefore, in this particular factory environment, a given item may be painted with primer paint at the work station named "Prime 1" 712 as shown in FIG. 8, and then be stored in "Prime storage 2" 801 shown in column 711. This area may then "feed into" finishing work stations "Finish 1" and "Finish 2" shown in column 802 for a final paint job.

Figure 9:
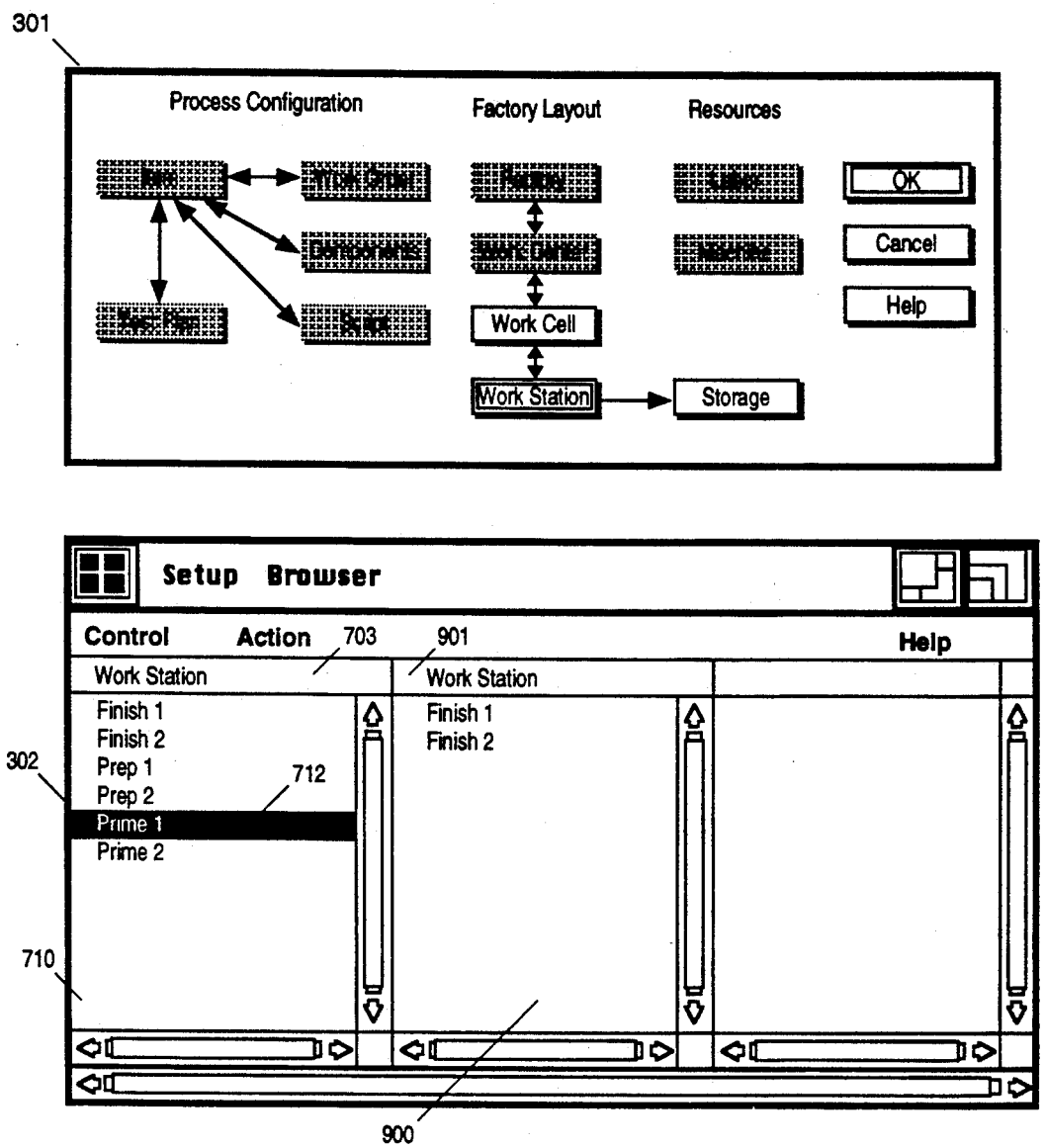
FIG. 9 shows how work stations may feed other work stations in the preferred embodiment.

In addition, storage areas may feed into other storage areas, or alternatively, work stations may feed into other work stations. This is accomplished by selecting the next column to the right in window 302, and selecting the object icon on window 301 a second time to show work station-to-work station relationships or storage area-to-storage area relationships. An example of this is shown in FIG. 9. As shown in FIG. 9, column 710 is populated by objects of the work station class and the "Prime 1" work station 712 has been selected. Then, work station icon 328 on window 301 may be selected a second time causing the next column 900 to the right of column 710 to contain the list of output work stations. A particular work station "Prime 1" 712 may then feed directly into work stations "Finish 1" and "Finish 2" shown in column 900. Work stations can then feed into other work stations in this example and no storage area is required as shown in FIG. 8.

Figure 10:
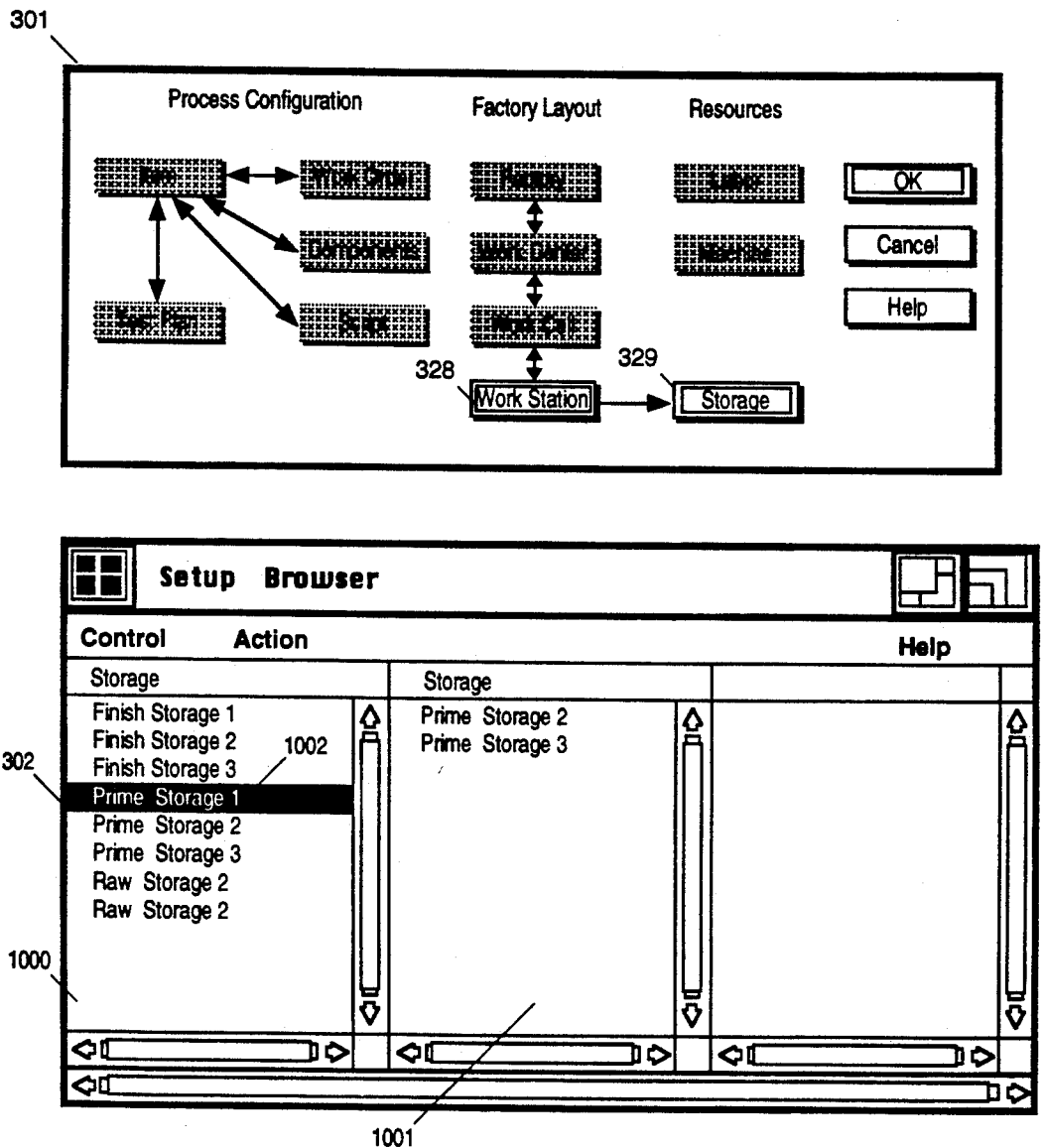
FIG. 10 shows how a storage area may feed into another storage area in the preferred embodiment.

Alternatively, storage areas may feed into other storage areas. An example of this is shown in FIG. 10. For instance, a storage object with the name "Prime Storage 1" 1002 in column 1000 of FIG. 10 may be selected. Then the storage object icon 329 on the browser map 301 may be selected again thus populating column 1001 to the right of column 1000. Thus, the storage object "Prime storage 1" 1002 may then feed into two other storage objects "Prime Storage 2" and "Prime storage 3" shown in column 1001. This particular situation may arise if one storage area was used for output parts to allow paint to dry, for example, and another storage area was used for input parts to finishing work stations once the parts were dry and ready for additional painting. In summary, for storage or work station objects while using the browser window 302, columns to the left of other columns are considered "feeder" objects, and objects listed to the right of a column are considered "consumer" objects. Because of the "self-feeding" capability of the work station and storage objects represented by icons 328 and 329 in window 302, both of these icons will remain ungreyed (selectable) when selected and objects are listed in a column, and will have a double border indicating that they are self-feeding.

Similarly, object icons residing in the "Process Configuration" section of window 301 may also be used to populate columns in window 302. For instance, the "Item" object icon 320 on window 301 may be selected, and thus all items may be listed in the first column 1100 in FIG. 11a of window 302. As discussed above, the name of the object class "Item" will be placed into the heading field 1101 in FIG. 11a. Then, one of the other interrelated objects represented by icons 321 through 324 may be selected to fill other columns in window 302. FIG. 11b shows where column heading 1102 is selected another object icon for "Components" 323 has been selected by the user. Notice that column heading 1102 has the name "Components" and column 1103 remains untitled. Notice also that the "Item" icon 320 has a double-border indicating that it is also selectable, similar to the work station icon 328 and storage icon 329, discussed above. As shown in FIG. 12, an item name has been selected in column 1100, thus causing column 1103 to be filled with the names of objects in the components class comprising the selected item name "Door (front right)" 1201 shown in column 1100. All of the components then comprising the item name 1201 highlighted in column 1100 are now contained in column 1200. Components object icon 323 may be selected again thus giving the bill of materials for each of the components comprising the item. Note that items in the process configuration section are not in a hierarchical relationship. In other words, after a column is selected and filled, all of the other icons remain selectable (ungreyed). Work orders may be associated with test plans, and scripts may be related to certain components. A wide variety of objects may be interrelated with one another in the Process Configuration section, so not all of the possible relationships are shown on the browser menu 301, or FIG. 2, but they are indicated when the next column is selected [Note: "greying out" accurately shows all possible relationships].

Figure 11A:
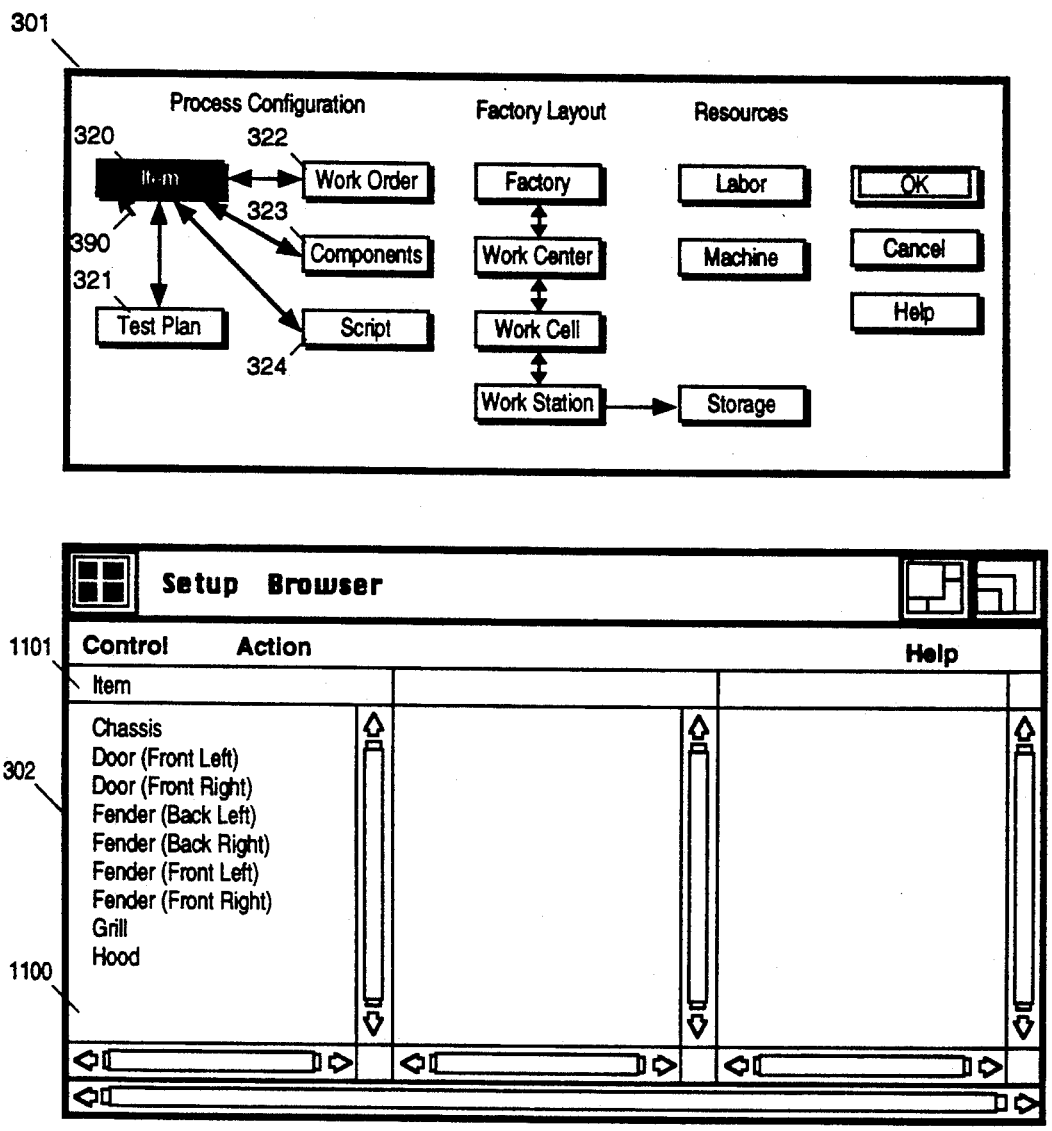
FIG. 11a shows populating the browser window with an Item object from the Process Configuration section of the browser map.
Figure 11B:
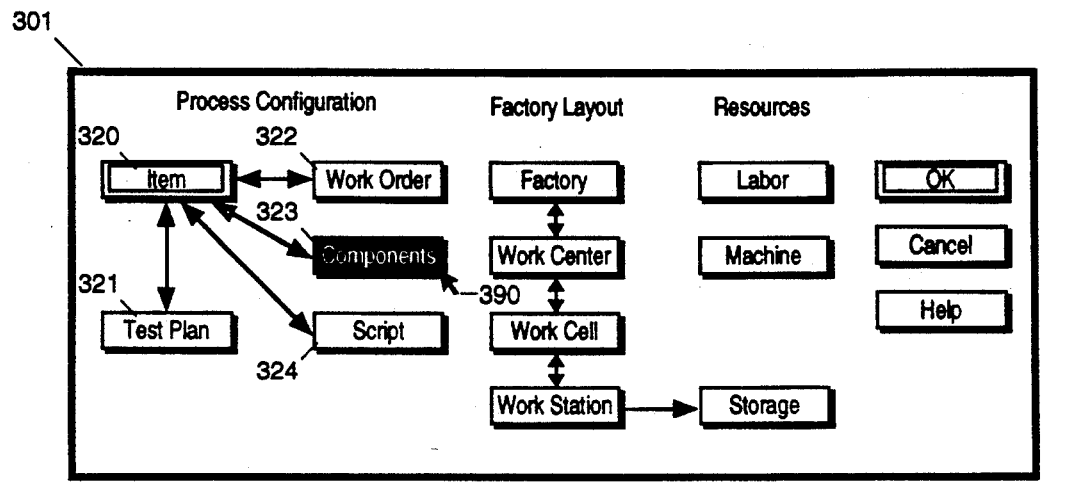
Figure 11B:
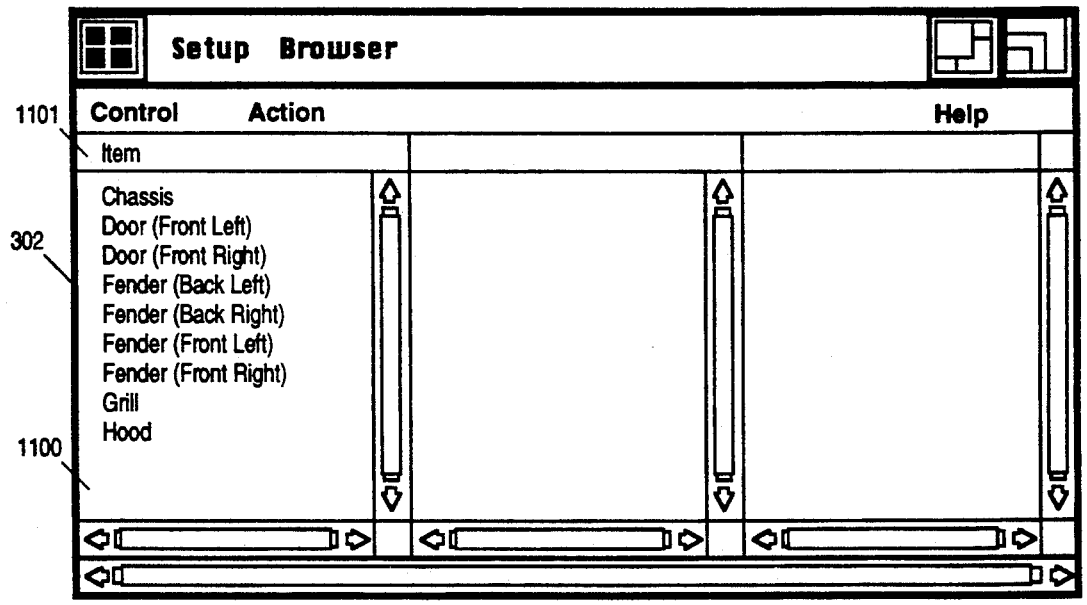
Figure 12:
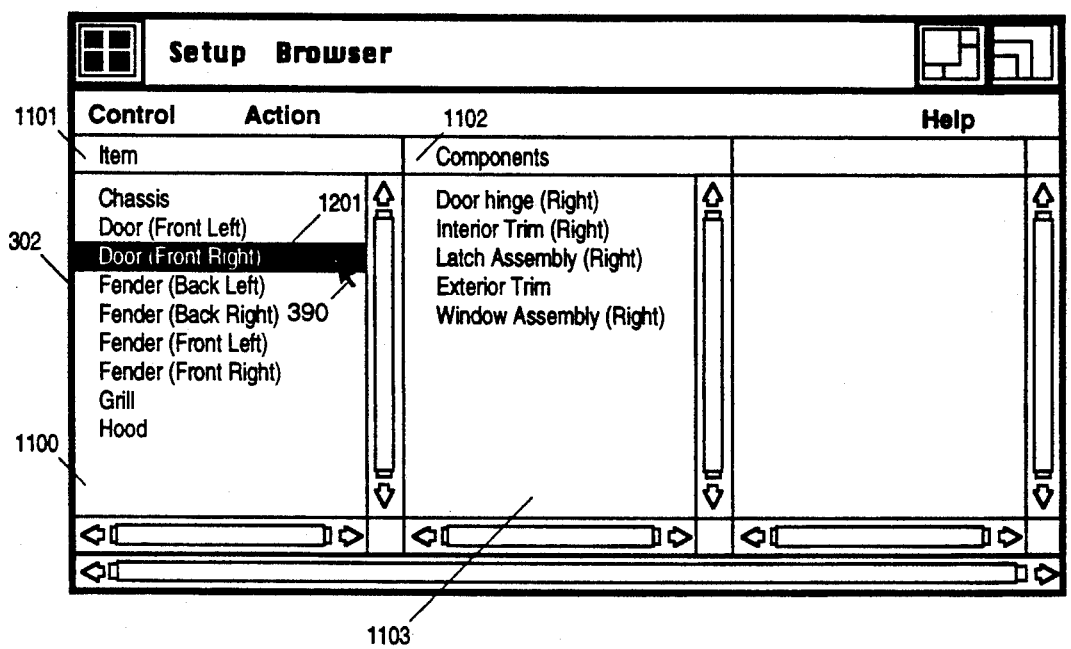
FIG. 12 shows populating a second column by selecting an item name from the first column of the browser.

Alternatively, column 1100 may be selected and list objects having other types in the Process Configuration section of the Browser Map 301 shown on FIGS. 11a and 11b by selecting the "Test plan" icon 321, "Work order" icon 322, "Components" icon 323, or "Script" order" icon 324. This will list all objects in column 1100 having that type. Then, column 1103 may be selected and the "Item" icon 320 be selected for a given name in column 1100, to fill column 1103 with the names of all items having a particular test plan, script, work order or item containing a particular component. Therefore, if a component becomes in short supply, a factory manager may determine whether the manufacture of certain items will be affected by the lack of those components and thus, he can plan accordingly.

Figure 13:
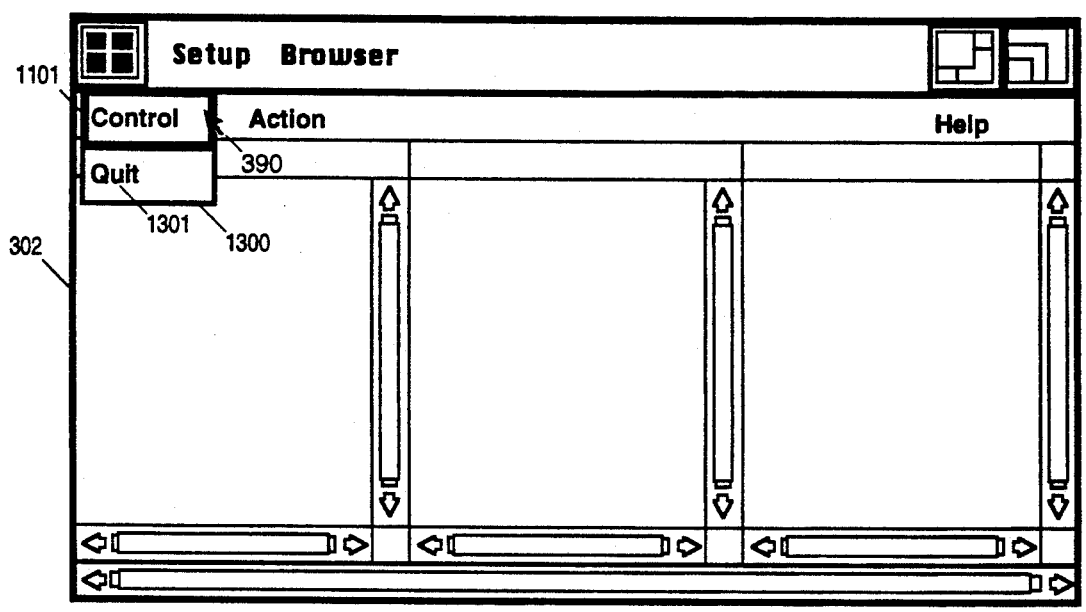
FIGS. 13 and 14 show various pull down menu options which are available on the browser window.

In addition to viewing the relationship between certain objects in the system, certain functions may be performed on various items shown in window 301. For instance, with reference to FIG. 13, cursor 390 may be used to "pull down" a menu 1308 from the left side of window 302. A "pull down" is accomplished by selecting and holding MB1 while pointing cursor 390 at the control option 1304 in browser 302 and moving the cursor vertically down until the desired option is reached. When the option is reached, MB1 is released, selecting the option. So, the user would select MB1, for instance, while pointing at "Control" 1304 on window 302, and continue to depress MB1 while moving the cursor to the "Quit" option 1301. While MB1 is depressed, the cursor is "dragged" to an appropriate position and released thus causing that particular command to occur. The "Quit" option 1301 is used to exit the browser menu and return to other functions provided within system 100. In an alternative embodiment, a "New" option on pull down menu 1300 shown in FIG. 13 may be used to create a new browser with blank columns. In another alternative embodiment, a "Duplicate" option may be used to copy the current relationships in the displayed browser to a new browser.

Figure 14:
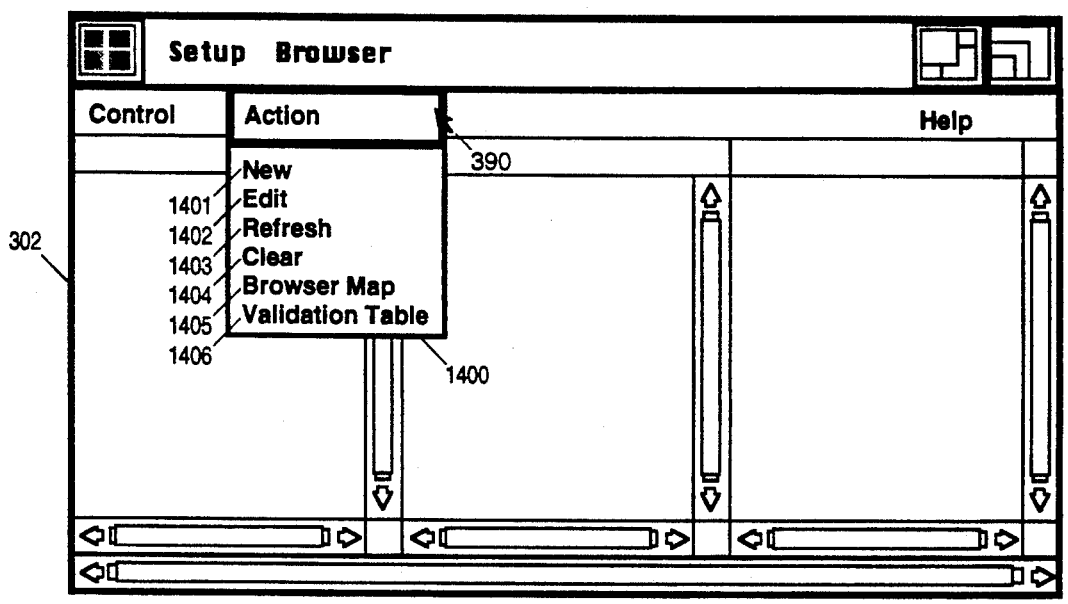

In a similar manner, as shown in FIG. 14, the "Action" menu 1400 may be pulled down in the same manner as menu P300 using cursor 390. The "Action" menu 1400 operates on objects having the selected name. The "New" action 1401 under the "Action" menu 1400 will display a blank object editor. The class of object to be created is identified by the heading of the selected column. The "Edit" option 1402 is used to modify existing objects. Object editors are beyond the scope of this invention but allow a user in the preferred embodiment to change relationships between objects, change the name of an object or modify other variables (e.g. the capacity for a machine object) associated with the object. The "Refresh" option 1403 will simply re-display the information displayed in a given column. This is done, by selecting the column which the user wishes to refresh, and then selecting the "Refresh" option 1403 on pull down window 1400. "Refresh" option 1403 will show any additions, deletions, or corrections done to the database since the last time browser window 302 was displayed.

"Clear" option 1404 is used for removing all information from a particular column on browser window 302.

Since columns to the right of the cleared column are related to the information in the left-most selected column, all of the columns to the right of the selected column are also cleared. The "Browser Map" option 1405 is used if the user wishes to view browser map 301 prior to selecting additional items from within a column. This allows the user to define what type of object a user now wishes to view in columns to the right of the currently active column. Finally, "Validation Table" option 1406, is used to establish a list of valid attributes of a factory object. This particular action is outside the scope of the present invention.

Thus, an invention for viewing relationships in a factory floor management system has been described. Although the present invention is described particularly with reference to FIGS. 1 through 14, it will be apparent to one skilled in the art that the present invention has utility far exceeding that disclosed in the figures. It is contemplated that many changes and modifications may be made by one of ordinary skill in the art, without departing from the spirit and scope of the invention, as disclosed above.

What is claimed is:

1. A method of displaying relationships of objects on a computer system display in a factory floor management system comprising a first class of objects which is related to a second class of objects in said factory floor management system, comprising the following steps:
   a. on a first portion of said computer system display, displaying a first icon, the first icon representing said first class of factory objects, said first icon being displayed in a state available for selection;
   b. on said first portion of said computer system display, displaying a second icon, the second icon representing said second class of factory objects, said second icon being displayed in a state available for selection;
   c. displaying a first connector connecting the first icon and the second icon, the first connector representing a relationship between the first class and the second class of factory objects;
   d. selecting the first icon;
   e. on a second portion of said computer system display, displaying a first list of names of all objects comprising the first class of factory objects;
   f. selecting a first name from the first list of names;
   g. on said second portion of said computer system display, displaying a second list of names of all objects in the second class of factory objects associated with the object from the first class having the first name; and
   h. re displaying said first icon and second icons on the first portion of said computer system display in states indicating whether they are available for selection according to said relationship between said first and said second classes of factory objects.

2. The method of claim 1, further comprising the following steps:
   a. on said first portion of said computer system display, displaying a third icon in a state available for selection, the third icon representing a third class of objects;
   b. displaying a second connector, the second connector connecting the third and second icons and representing a relationship between the second and the third class of objects;
   c. selecting a second name from the second list of names;
   d. on said second portion of said computer system display, displaying a third list of names of all objects in the third class of factory objects associated with an object from the second class having the second name; and
   e. re displaying said first icon, said second icon, and said third icon on the first portion of said computer system display in states indicating whether they are available for selection according to said relationship between said first, said second and said third classes of factory objects.

3. The method of claim 2 wherein the first, second and third classes of factory objects comprise resources in a factory.

4. An apparatus for displaying relationships of objects on a computer system display in a factory floor management system comprising a first class of objects which is related to a second class of objects in said factory floor management system, comprising:
   a. means for displaying a first icon in a state available for selection by a user on a first portion of said computer system display, the first icon representing said first class of factory objects;
   b. means for displaying a second icon in a state available for selection by a user on said first portion of said computer system display, the second icon representing a second class of factory objects;
   c. means for displaying a first connector connecting the first icon and the second icon, the first connector representing a relationship between the first class and the second class of factory objects;
   d. means for selecting the first icon;
   e. means for displaying a first list of names of all objects on a second portion of said computer system display comprising the first class of factory objects;
   f. means for selecting a first name from the first list of names;
   g. means for displaying a second list of names on said second portion of said computer system display of all objects in the second class of factory objects associated with the object from the first class having the first name;
   h. means for re displaying said first icon and said second icon on the first portion of said computer system display in states indicating whether they are available for selection according to said relationship between said first and said second classes of factory objects.

5. The apparatus of claim 4, further comprising:
   a. means for displaying a third icon on said first portion of said computer system display, the third icon representing a third class of objects;
   b. means for displaying a second connector, the second connector connecting the third and second icons and representing a relationship between the second and the third class of objects;
   c. means for selecting a second name from the second list of names;
   d. a means for displaying a third list of names of all objects in the third class of factory objects associated with an object from the second class having the second name on said second portion of said computer system display; and
   e. a means for re displaying said first icon, said second icon, and said third icon on the first portion of said computer system display in states indicating whether they are available for selection according to said relationship between said first, said second and said third classes of factory objects.

6. The apparatus of claim 5 wherein the first, second, and third classes of factory objects each comprise resources in a factory.

7. A computer-controlled method of displaying on a computer system display relationships between classes of objects in a factory floor management system, comprising the following steps:
   a. displaying a plurality of icons in an state available for selection on a first portion of said computer system display, said icons representing relationships between classes of said objects in said factory, said plurality of icons displayed with links representing said relationships;
   b. selecting one of said plurality of icons representing a first of said classes of said factory objects;
   c. displaying a first list of names of objects comprising the first of said classes of said factory objects on a second portion of said computer system display;
   d. re displaying said plurality of icons on said first portion of said computer system display, a first set of said plurality of icons being shown in an state available for selection, said first set of said plurality of icons representing all of the classes of said factory objects which are immediately related to said first of said classes of factory objects, a second set of said plurality of icons being shown in a state not available for selection, said second set of said plurality of icons representing said objects not immediately related to said first of said classes of objects;
   e. selecting a first name from said first list of names of objects comprising the first of said classes of said factory objects;
   f. displaying a second list of names of objects comprising a second of said classes of said factory objects on said second portion of said computer system display, said second of said classes of said factory objects being directly related to said first of said classes of said factory objects; and
   g. re displaying said plurality of icons, a third set of said plurality of icons being shown in an state available for selection, said third set of said plurality of icons representing all of the classes of said factory objects which are immediately related to the class of said second object, a fourth set of said plurality of icons being shown in a state not available for selection, said second set of said plurality of icons representing said objects not immediately related to said class of said first object of said plurality of objects.

8. A computer-controlled method of displaying relationships between objects in a computer-controlled factory floor management system having a database with relationships between said objects comprising the following steps:
   a. displaying a map on a first portion of a display coupled to said computer-controlled factory management system showing relationships between classes of objects in said factory floor management system, said map including a plurality of icons and connectors representing said relationships between said classes of objects;
   b. allowing a user to select a first icon of said plurality of icons using a selection device coupled to said factory floor management system, said first icon representing a first class of objects in said factory floor management system;
   c. displaying a first plurality of names representing all objects comprising a first class of objects represented by said first icon on a second portion of said display; and
   d. allowing a user to select a first name from said plurality of names, said first name representing a first object in said first class of objects;
   e. displaying a second plurality of names on said second portion of said display representing all objects comprising a second class of objects immediately related to said first class of objects represented by a second icon on said second portion of said display; and
   f. updating said map on said first position of said display, said map showing a first set of said plurality of icons representing classes of objects immediately related to the first class of objects in a state available for selection, said map further showing a second set of said plurality of icons in a state not available for selection, said second set of said plurality of icons representing classes of objects not immediately related to the first class of objects.

* * * * *